A. Barbarin,
Vapor Burner.

Nº 82,273.    Patented Sep. 22, 1868.

Witnesses:

Inventor:
Arthur Barbarin
by A. Pollok
his atty

UNITED STATES PATENT OFFICE.

ARTHUR BARBARIN, OF NEW ORLEANS, LOUISIANA.

IMPROVEMENT IN THE PRODUCTION OF GAS, AND ILLUMINATING STREET AND OTHER CARS.

Specification forming part of Letters Patent No. 82,273, dated September 22, 1868.

*To all whom it may concern:*

Be it known that I, ARTHUR BARBARIN, of the city of New Orleans, parish of Orleans, and State of Louisiana, have invented a certain new, useful, and Improved Mode of Generating and Applying Illuminating-Gas on Street and other Cars and other conveyances; and I hereby declare the following to be a full, clear, and exact description of the same, reference being had to the accompanying drawings.

My invention has relation to the method of generating illuminating-gas, by charging air with hydrocarbon vapor; and its object is to provide a ready and simple means of generating and applying gas of this kind to steam or horse cars, or like conveyances.

My object, further, is to generate gas at or near the point of consumption, to use but a very limited quantity of carbureting-liquid, and to make the apparatus so compact and of such dimensions as to admit of its being used without inconvenience upon any kind of land conveyance.

To do this, I employ, in connection with a generator or carbureting-chamber, in which the carbureting liquid is held, and through which the air is forced, a reservoir of compressed air, which may be of any suitable size, so as to contain a supply of compressed air sufficient to last during the trip, or between stations, or for a longer time, if required. This compressed air-tank is located in any convenient part of the car; and in such street or other cars as may be driven by compressed air, as many now are, it may be connected or form part of the compressed-air reservoirs for giving motion to the car. A stop-cock, between the air-tank and carbureting-vessel, will regulate the flow of air, and prevent it from being forced too rapidly through the hydrocarbon liquid. The tank can be of any suitable construction, and can be filled with compressed air in the usual manner. I have contemplated employing for this purpose an india-rubber bag, provided with a top and bottom stop-cock, and encircled and protected by a closely-woven cage of wire-gauze, twine, or other suitable material, in order that it may not burst during or after inflation. The rubber bag will always preserve its power of contraction so long as it contains sufficient air to keep its walls distended. It may be arranged or secured in a frame attached to any convenient portion of the car, or may be held in place by other suitable means.

Figure 1:
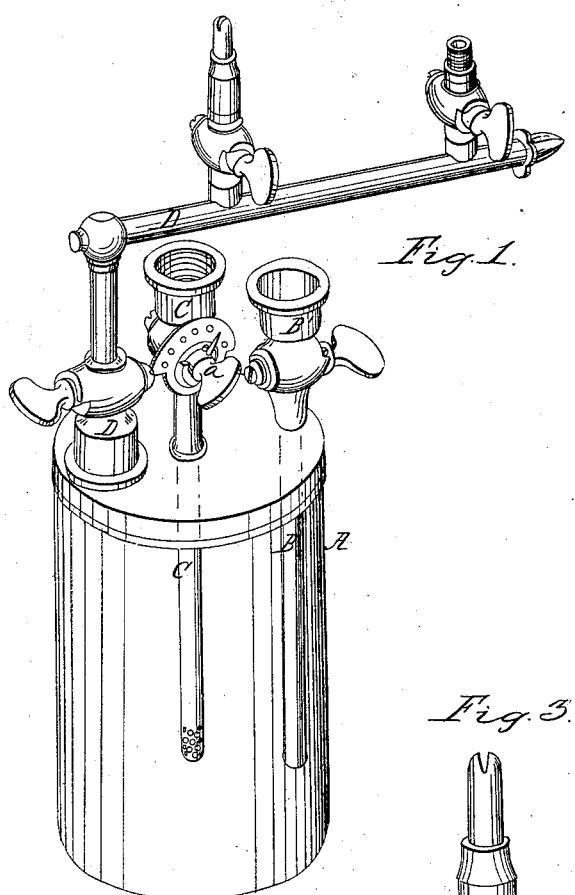
Figure 2:
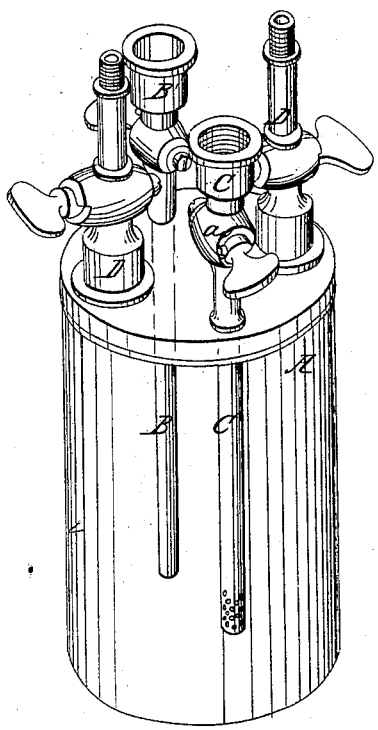

The apparatus represented in Figures 1 and 2 is a carbureter intended for use in connection with the compressed-air tank.

The carbureter A is closed by an air-tight cover, in which are held the pipe B, for the entrance of the hydrocarbon liquid, the pipe C, through which the compressed air from the tank enters, and the pipe D, for the discharge of the carbureted air. The pipe B extends down within and nearly to the bottom of the reservoir, its lower end being immersed in the liquid, so as to prevent the escape of air in that direction. A funnel, B', is formed upon its upper end, which also is provided with a stop-cock. The air-pipe C also extends down within the carbureting-vessel, but not so far as the pipe B, and its lower end has a series of perforations, through which the compressed air is discharged in fine streams into the body of the carbureting-liquid. The upper end of this pipe is connected with the compressed-air tank, and a graduated stop-cock, a, regulates the flow of air. The carbureted-air pipe D extends up from the top of the vessel, and carries one or more burners.

Figure 3:
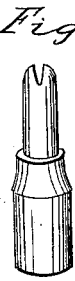

The general operation of the apparatus is too well understood to need explanation. I would, however, call attention to one feature of the apparatus, which is this: The vessel A is, from the nature of the case, comparatively small, and contains an inconsiderable quantity of hydrocarbon liquid; and I find that the air thus carbureted will not burn with sufficient brilliancy when gas-burners of ordinary construction, such as "bat's-wing" or "fish-tail," are employed. With these burners I can obtain only a blue flame, which, while of intensity, will give but little light. I have, however, remedied this defect by constructing the burner as shown in Fig. 3. Instead of having the straight narrow slit of the bat's-wing or the perforations of the fish-tail, I make the slot V-shaped, and of increased size, gradually widening toward the top of the burner, and by this means a sufficient quantity of carbon is mingled with atmospheric air to produce a brilliant flame, and one well adapted for car-lighting.

In order to prevent the agitation of the oil or liquid in the carbureting-vessel while the car is in motion, I place within the vessel the fibers of the ramie-plant, or any other suitable substance.

The vessel may be placed in the fare-box of the car, or in any other convenient locality, preferably near the point where the burner is situated; and I find it advantageous in many instances to inclose it within a box or receptacle, as well to protect it from changes of temperature as to prevent it from being handled by unauthorized persons.

The use of the gas-burner in the fare-box of a street-car is of considerable advantage, as not only is a better light thereby obtained, but the light is less liable to be blown out, and there is no danger from explosion, as there is when the ordinary coal-oil lamp is employed, the latter being also very liable to be jostled about and displaced by the movement of the car.

Having now described my invention, and the manner in which the same is or may be carried into effect, what I claim, and desire to secure by Letters Patent, is—

1. The method of generating illuminating-gas on railway or street cars or other conveyances, by the use, in such conveyances, of one or more reservoirs or tanks of compressed air, operating, in connection with a carbureting-vessel and burners, for the consumption of the carbureted air, substantially in the manner herein set forth.

2. A burner for carbureted air, the slit or opening in which for the discharge of said air is formed substantially as shown and described.

In testimony whereof I have signed my name to this specification before two subscribing witnesses.

ARTHUR BARBARIN.

Witnesses:
    IRYL. BARTLETT,
    P. L. VINOT.